(12) United States Patent
Wong

(10) Patent No.: US 9,772,507 B2
(45) Date of Patent: Sep. 26, 2017

(54) SPECTACLE FRAME WITH INTERTWINING HELIX JOINTS AND NOSE PAD STRUCTURE TO FACILITATE INTERCHANGING OF LENSES

(71) Applicant: Chak Yuen Wong, Hong Kong (HK)

(72) Inventor: Chak Yuen Wong, Hong Kong (HK)

( * ) Notice: Subject to any disclaimer, the term of this patent is extended or adjusted under 35 U.S.C. 154(b) by 0 days.

(21) Appl. No.: 15/055,447

(22) Filed: Feb. 26, 2016

(65) Prior Publication Data

US 2016/0266401 A1 Sep. 15, 2016

Related U.S. Application Data

(60) Provisional application No. 62/132,539, filed on Mar. 13, 2015.

(51) Int. Cl.
| | |
|---|---|
| *G02C 5/14* | (2006.01) |
| *G02C 1/08* | (2006.01) |
| *G02C 5/22* | (2006.01) |
| *G02C 5/16* | (2006.01) |
| *G02C 5/12* | (2006.01) |
| *G02C 5/00* | (2006.01) |

(52) U.S. Cl.
CPC ............ *G02C 1/08* (2013.01); *G02C 5/2272* (2013.01); *G02C 5/008* (2013.01); *G02C 5/12* (2013.01); *G02C 5/146* (2013.01); *G02C 5/16* (2013.01); *G02C 2200/10* (2013.01)

(58) Field of Classification Search
CPC ........ G02C 5/16; G02C 1/08; G02C 2200/10; G02C 5/12; G02C 5/143; G02C 5/146; G02C 5/2272
USPC ... 351/92, 90, 93, 95, 98, 99, 100, 101, 111, 351/116, 153, 124, 131, 132, 83, 41; 16/228
See application file for complete search history.

(56) References Cited

U.S. PATENT DOCUMENTS

| | | | | |
|---|---|---|---|---|
| 2,746,087 A | * | 5/1956 | Dolezal ................. | B29D 12/02 16/228 |
| 5,073,020 A | * | 12/1991 | Lindberg ................. | G02C 1/02 351/106 |
| 5,135,296 A | * | 8/1992 | Lindberg ................. | G02C 1/02 351/103 |
| 6,015,212 A | * | 1/2000 | Fortini ..................... | G02C 1/04 351/92 |
| 6,264,326 B1 | * | 7/2001 | Hyoi ........................ | G02C 1/04 351/92 |
| 6,315,406 B1 | * | 11/2001 | Carraro .................... | G02C 1/04 351/138 |

* cited by examiner

*Primary Examiner* — Hung Dang
(74) *Attorney, Agent, or Firm* — Wayne & King LLC

(57) ABSTRACT

This patent application relates to spectacles or spectacle frames with intertwining helix joints and a nose pad portion to facilitate an interchanging of lenses of the spectacles. The helix joint allows the temples to move into a folded position. The nose pad portion provides an access portion for detaching and/or attaching the lenses.

19 Claims, 4 Drawing Sheets

SPECTACLE FRAME WITH INTERTWINING HELIX JOINTS AND NOSE PAD STRUCTURE TO FACILITATE INTERCHANGING OF LENSES

CROSS REFERENCE TO RELATED APPLICATION

The present invention claims the benefits and advantages of U.S. provisional application Ser. No. 62/132,539, filed on Mar. 13, 2015, entitled "SPECTACLE FRAME WITH INTERTWINING HELIX JOINTS AND NOSE PAD STRUCTURE TO FACILITATE INTERCHANGING OF LENSES", of which is herein incorporated by reference in its entirety.

TECHNICAL FIELD

The present application relates to a spectacle frame, and in particular to intertwining helix joints connecting a front part and temples of the frame. It also relates to a spectacle frame with a nose pad structure that facilitates interchanging of lenses.

BACKGROUND

A spectacle temple joint fulfills several requirements. It allows a temple to be moved between a folded position for storage and an open position for wearing by a user. A common type of joint has a "door hinge" type of mechanism. It includes a pin for connecting two hinge halves, each of which is attached to a spectacle frame by screws or rivets. A common type of spectacle frame for holding lenses has a complete geometry, such as a complete circle or a complete rectangle.

In addition, two nose pads extend rearwards from the front of the frame for resting on the nose of a wearer when the spectacle frame is being worn. The common type of nose pad made of soft materials is usually fixed on a metal bracket by a screw. The bracket is further connected to the front of the frame by a thin wire.

In the above construction of joints and nose pads, there are many parts to manufacture and things may go wrong. The screws would become loose and could be lost. It also involves labor intensive assembling procedures.

Lenses are commonly fixed on a spectacle frame either by embedding them in grooves formed on the front of the frame or by holding them with wires. However, both methods make it hard for a user to detach the lenses without tools and undermine the potential of interchanging different lenses, such as prescription lenses and tinted lenses, on the same frame.

SUMMARY OF THIS DISCLOSURE

One of the objectives of the spectacle frame disclosed in the present application is to provide a joint that is simple, reliable and adaptable. It should also be easy to manufacture and maintain.

This objective can be achieved by an intertwining helix joint which connects temples and a front portion of a spectacle frame. The joint may include two intertwining helixes with different sectional profiles. The two intertwining helixes do not touch each other but leave a space in-between. Smaller sectional profile of the helixes at an inner side leaves more space between them and thus allows the temples to be bent 90 degrees inward to a folded position for easy storage, while larger sectional profile of the helixes at an outer side leaves less space between them and thus provides a firm stop at an open position. The intertwining helix joint can exert a small amount of force on a wearer's head which helps to secure a spectacle in place.

Besides, the temple can be bent in all directions, making it adaptable to features on the face of a wearer, such as levels of the ears and nose, which are slightly different for different people.

Another objective of the spectacle frame disclosed in the present application is to provide a nose pad structure that is robust and a frame with easily interchangeable lenses.

This objective can be achieved by one single feature, namely a bent portion at the front of the frame which can also serve as a nose pad. It is a continuation of the frame and contains no small parts. The bent portion renders the front of the frame incomplete, leaving an access space for easily detaching and attaching lenses by hands without any tools.

The spectacle frame can be manufactured in one monolithic construction. Its complex geometries cannot be made by conventional manufacturing methods such as plastic injection molding or hand making from acetate sheet. However, it can be manufactured by additive manufacturing (3D Printing) technique with flexible materials such as plastic or any other suitable materials.

The spectacle frame disclosed in the present application makes eyeglasses comfortable to wear, become reliable and multi-functional.

In addition, with an online sales platform, users are able to specify the total width of an eyewear, the length of the temples and the size of the nose pads. The resultant frame can be 3D printed in one monolithic construction with all the chosen features incorporated.

This bespoke eyewear appeals to those who demand a high level of comfort which cannot be satisfied by conventional off-the-shelf frames with one standard size. They include users with atypical facial features, contact lens users who are not satisfied with the comfort level of conventional eyewear, or young children. It is also suitable for those who are looking for a personalized item for themselves or a gift for someone else.

It fills the gap of the kid's eyewear market. There are small-sized spectacles to choose from the online sales platform. There are no small loose parts, and thus are safe for children.

The spectacle frame disclosed in the present application can benefit the eyewear industry by introducing a completely new manufacturing method (i.e. 3D Printing), and a new business model (i.e. 3D Printed-to-order) to the eyewear industry. This can lower the initial capital input and thus the risk of product development since no inventory is required. It can encourage smaller to medium-sized product design enterprises to develop and retail their products.

The marketability of the spectacle frame is very high because fully functional prototypes have been successfully produced. The manufacturing cost is also viable to achieve reasonable profits by retail at a price range competitive to conventional eyewear.

Although the spectacle frame and the spectacle are shown and described with respect to certain embodiments, it is obvious that equivalents and modifications will occur to others skilled in the art upon the reading and understanding of the specification. The spectacle frame in the present application includes all such equivalents and modifications, and is limited only by the scope of the claims.

BRIEF DESCRIPTION OF THE DRAWINGS

Specific embodiments of the spectacle frame will now be described by way of example with reference to the accompanying drawings wherein.

DETAILED DESCRIPTION

Figure 1:
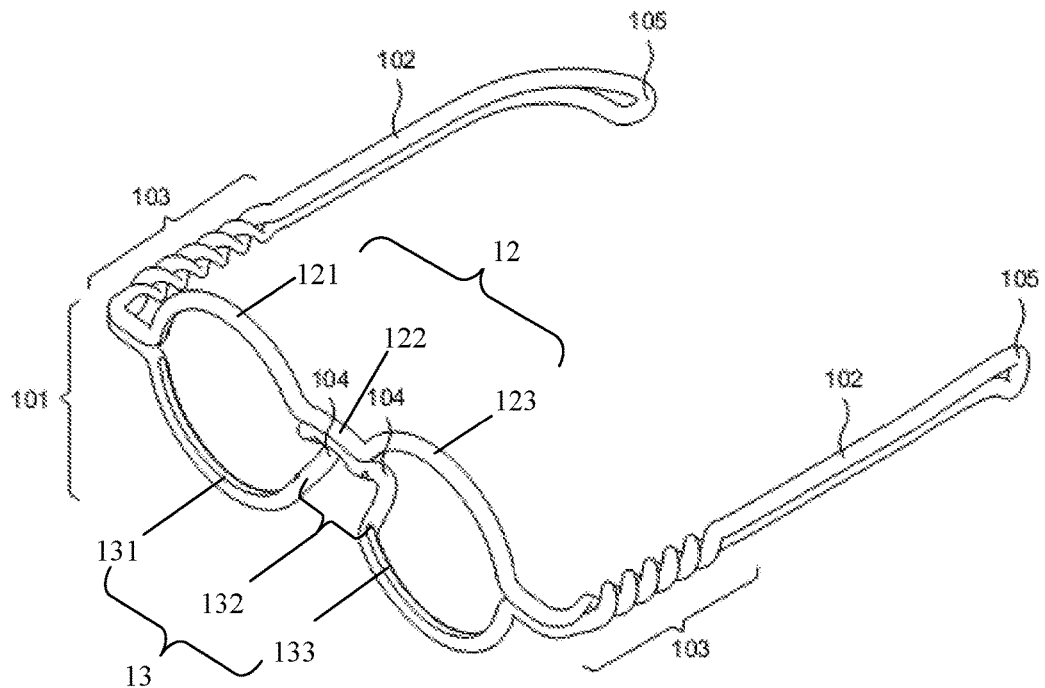
FIG. 1 is a front perspective view of a spectacle frame with intertwining helix joints and a nose pad structure according to an embodiment disclosed in the present application.
Figure 2:
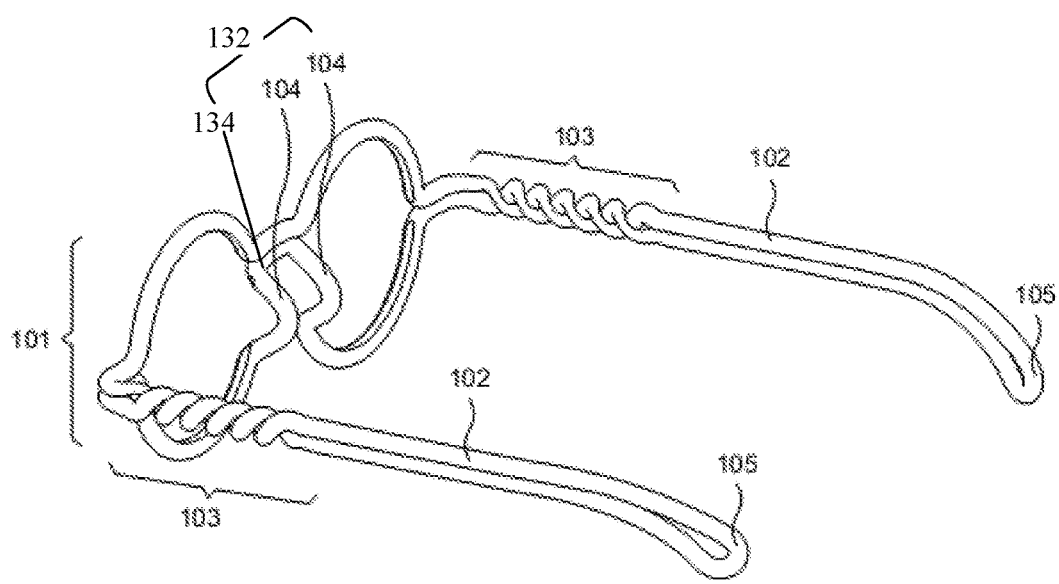
FIG. 2 is a rear perspective view of the spectacle frame of FIG. 1.
Figure 3:
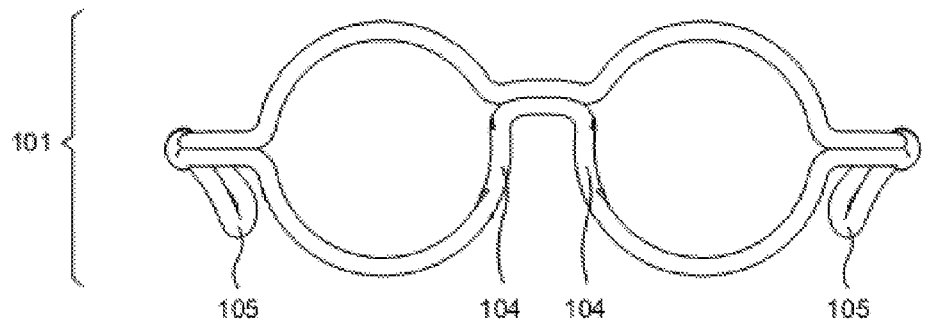
FIG. 3 is a front view of the spectacle frame of FIG. 1.
Figure 4:
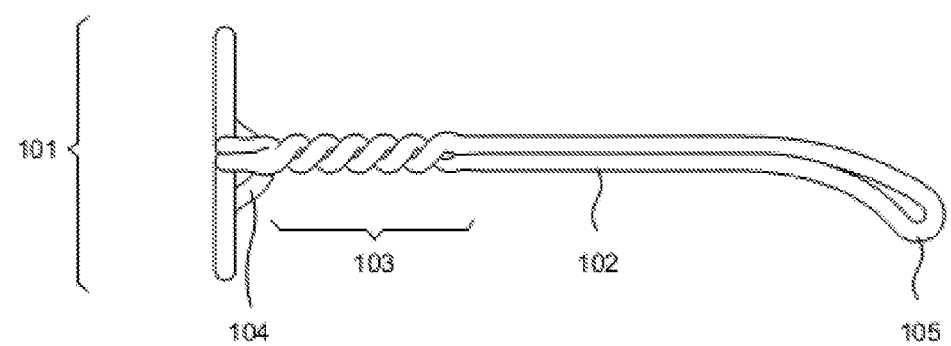
FIG. 4 is a side view of the spectacle frame of FIG. 1.

FIGS. 1-4 show different views of an embodiment of a spectacle frame. The spectacle frame may include a front portion 101 and two temples 102 which are connected to the front portion 101 by two intertwining helix joints 103 respectively, so that the two temples 102 can be moved between a folded position (not shown) for storage and an open position as shown in FIGS. 1 and 2.

The front portion 101 may include an upper rim 12 portion and a lower rim portion 13. The upper rim portion 12 may include a left portion 121 conforming in shape with an upper edge of a left lens, a right portion 123 conforming in shape with an upper edge of a right lens, and a middle bridge portion 122 extending between the left and right portions of the upper rim portion 12.

Similarly, the lower rim portion 13 may include a left portion 131 conforming in shape with a lower edge of the left lens, a right portion 133 conforming in shape with a lower edge of the right lens, and a middle nose pad portion 132 extending between the left and right portions of the lower rim portion 13.

The middle nose pad portion 132 may include a middle bridge-abutting portion 134 configured to abut against the middle bridge portion 122 of the upper rim portion 12, and two spaced-apart bent portions 104 extending between two inner ends of the left and right portions of the lower rim portions 13 and two opposite ends of the middle bridge-abutting portion 134 respectively. The two bent portions 104 are in the form of two rearward extending projections defining two nose-engaging surfaces that are adapted to rest on the two sides of the nose of a wearer when the spectacle is being worn. The two bent portions 104 expose portions of the edges of the lenses and create an access space about the size of a fingertip, making it easy to detach the lens and attach another one on the frame.

Conventional grooves may be formed on the inner sides of the upper and lower rim portions of the front portion 101 for positioning and holding the lenses on the frame.

Each temple 102 may include elongate upper and lower portions. The two rear ends of the elongate upper and lower portions of each temple 102 may be formed into a round loop 105. The two front end portions of the elongate upper and lower portions of each temple 102 may be provided with a joint 103 in the form of two intertwining helixes.

As a result, the temples 102 can be bent in 90 degrees at all directions. This renders the spectacles to adapt to facial features of the wearer.

Two generally L-shaped portions may extend between the two outer ends of the upper and lower rim portions and the two front ends of the two intertwining helixes of the joint 103 of each temple 102 respectively.

The front portion 101, the temples 102 with the joints 103, and the nose pad 104 may be made by additive manufacturing (3D Printing) technique as one monolithic piece using flexible materials such as plastic or any other suitable materials.

Although it has been shown that the helixes of the joints 103 have circular sectional profile, it is understood by one skilled in the art that the helixes of the joints 103 can have other possible sectional profiles such as oval, rectangular, polygon, etc.

Figure 5:
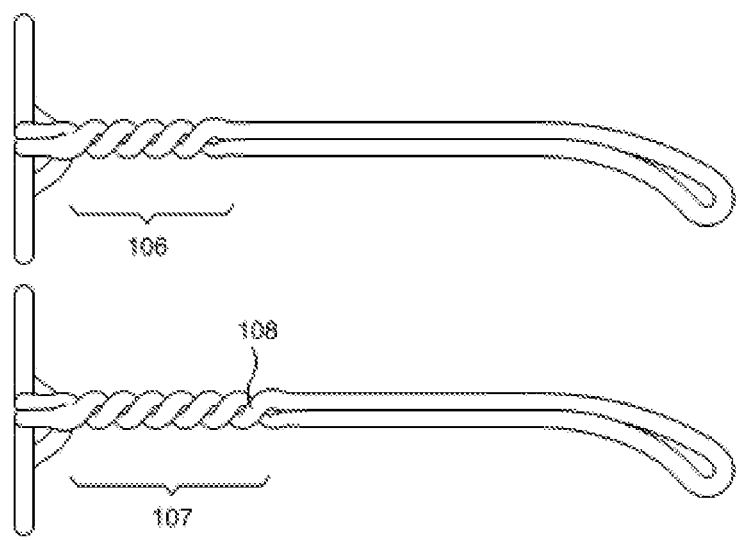
FIG. 5 shows two further embodiments of the intertwining helix joint having an increasing or decreasing number of turn of the helix.

FIG. 5 shows two further embodiments of the intertwining helix joint having an increasing or decreasing number of turn of the helix.

One further embodiment of the intertwining helix joint is designated by reference numeral 106, as shown in the first drawing. It can be seen that this intertwining helix joint 106 has one less helical turn as compared with the embodiment of the intertwining helix joint 103 depicted in FIG. 4.

Another further embodiment of the intertwining helix joint is designated by reference numeral 107, as shown in the second drawing. It can be seen that this intertwining helix joint 107 has one more helical turn as compared with the embodiment of the intertwining helix joint 103 depicted in FIG. 4.

Although it has been shown and described that there are about 5-7 turns in the intertwining helix joint 103, 106, 107, it is appreciated by one skilled in the art that the intertwining helix joint may have any number of turns.

Figure 6:
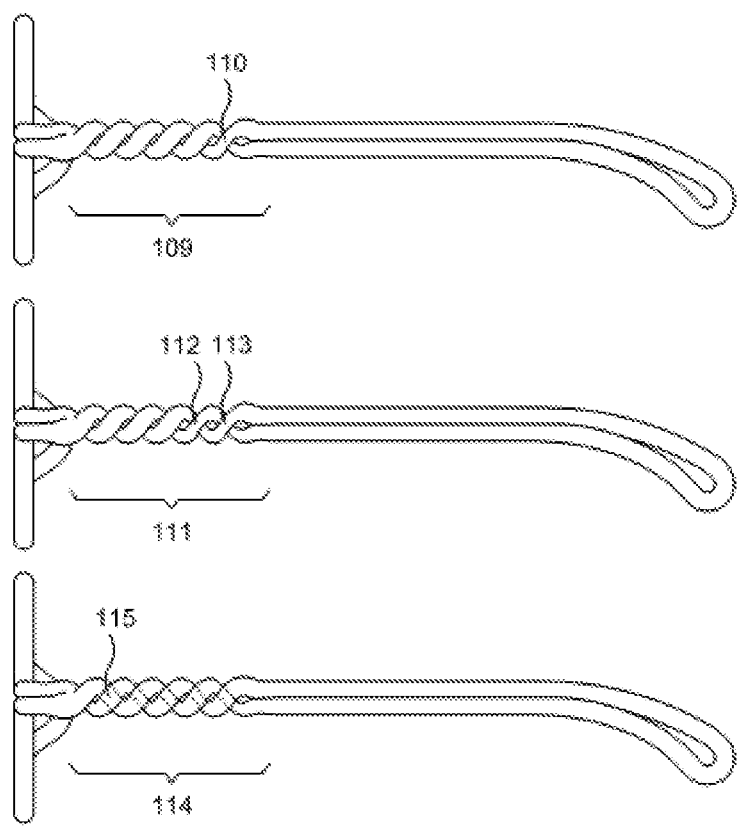
FIG. 6 shows three further embodiments of the intertwining helix joint having different sizes of circular cross section at different portions of the helixes.

FIG. 6 shows three further embodiments of the intertwining helix joint having different sizes of circular cross section at different portions of the helixes.

One further embodiment of the intertwining helix joint is designated by reference numeral 109, as shown in the first drawing. It can be seen that this intertwining helix joint 109 has a helically turning portion 110 with a smaller sectional profile.

Another further embodiment of the intertwining helix joint is designated by reference numeral 111, as shown in the second drawing. It can be seen that this intertwining helix joint 111 has a plurality of helically turning portions 112, 113 with a smaller sectional profile.

Yet another further embodiment of the intertwining helix joint is designated by reference numeral 114, as shown in the third drawing. It can be seen that this intertwining helix joint 114 has helically turning portions 115 with a larger sectional profile disposed at the inner side of the joint 114.

Although it has been shown and described that the helically turning portions with smaller circular sectional profile are formed at the rear or inner side of the intertwining helix joint, it is contemplated by one skilled in the art that the helically turning portions with smaller circular sectional profile can be formed at any suitable portions of the intertwining helix joint. The sectional profile may be circular or in any other appropriate shapes. Furthermore, the intertwining helix joint may have any suitable sizes, such as length, height and width.

Figure 7:
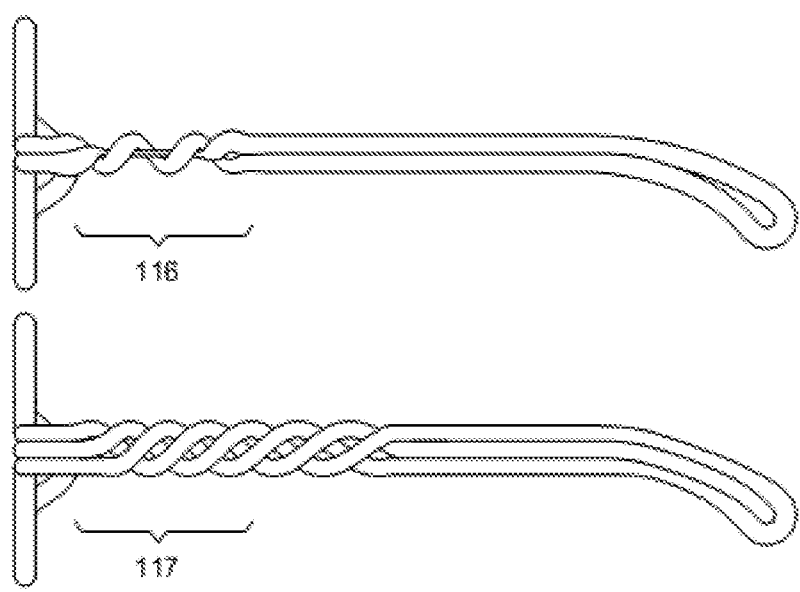
FIG. 7 shows two further embodiments of the intertwining helix joint having an increasing or decreasing total number of helix.

FIG. 7 shows two further embodiments of the intertwining helix joint having an increasing or decreasing total number of helix.

The first drawing in FIG. 7 shows a joint 116 having only one helix. The other helix is replaced by a straight elongated portion having a smaller sectional profile. The straight elongated portion may be disposed along a central axis of the single helix. The second drawing shows a joint having three intertwining helixes. It can be seen that spaces are formed between the three intertwining helixes to facilitate bending of the temple of the spectacle frame.

Although it has been shown and described that there are 1-3 intertwining helixes in a joint, it is understood by one skilled in the art that the joint may have any number of helixes.

While the spectacle frame has been shown and described with particular references to a number of preferred embodiments thereof, it should be noted that various other changes or modifications may be made without departing from the scope of the appended claims.

The invention claimed is:

1. A spectacle frame, comprising a front portion for receiving a left lens and a right lens, and two temples each of which connects to an end of the front part; the two temples are moveable between a folded portion and an open position with respect to the front part; wherein each temple connects to the front portion by a helix joint, said helix joint comprises a plurality of intertwining helixes that extend along a length direction of each temple; wherein all of the front portion, the two temples and the helix joints of the spectacle frame are one 3D-printed monolithic piece.

2. The spectacle frame of claim 1, wherein the spectacle frame has a symmetry axis, and the helix joint comprises an inner side closing to the symmetry axis and an outer side away from the symmetry axis; a first portion of the helixes at the inner side of the helix joint have a smaller sectional profile, and a second portion of the helixes at the outer side of the helix joint have a larger sectional profile.

3. The spectacle frame of claim 1, wherein the sectional profile of the helixes comprises a circular shape, an oval shape, a rectangular shape or a polygon shape.

4. The spectacle frame of claim 1, wherein the helix joint comprises one or more helical turns.

5. The spectacle frame of claim 1, wherein the front portion comprises a frame portion for holding the lenses; the frame portion is integrally arranged with a nose pad portion, and an access space is defined at the nose pad portion for detaching and/or attaching the lenses to the frame portion.

6. The spectacle frame of claim 5, wherein the nose pad portion is integrally formed by bending the front portion.

7. The spectacle frame of claim 5, wherein the nose pad portion comprises a pair of bent portions that are spaced apart from each other; the pair of bent portions extends along a rearward direction with respect to the frame portion to define two nose-engaging surfaces;
wherein the bent portions surround the lenses incompletely and the access space is disposed on the bent portions.

8. The spectacle frame of claim 7, wherein the front portion comprises an upper rim and a lower rim, which two surround into the frame portion; the nose pad portion is part of the lower rim, and the nose pad portion abuts against the upper rim.

9. The spectacle frame of claim 5, wherein the helix joint, the front portion, the nose pad portion and the temple are in one monolithic construction with each other.

10. A spectacle comprising a spectacle frame of claim 1, and two lenses held by the spectacle frame.

11. The spectacle frame of claim 1, wherein the sectional profile of the helixes comprises a constant shape, a changing shape a changing size of a same shape or a changing size of different shapes.

12. The spectacle frame of claim 1, wherein the helix joint comprises at least two intertwining helixes.

13. The spectacle frame of claim 1, wherein the spectacle frame has a symmetry axis, and the helix joint respectively comprises an inner side closing to the symmetry axis, an outer side away from the symmetry axis, an upper side in a higher orientation relative to the symmetry axis, and a lower side in a lower orientation relative to the symmetry axis; the helixes at the inner side and the outer side of the helix joint have a smaller sectional profile relative to those at the upper side and the lower side of the helix joint.

14. A spectacle frame, comprising a front portion for receiving a left lens and a right lens, wherein the front portion comprises a nose pad portion that is integrally formed by bending the front portion, and an access space is defined at the nose pad portion for detaching and/or attaching the lenses;
the spectacle frame further comprises two temples respectively connected at one of its extremity to an end of the front portion; each temple connects to the front portion by a helix joint, said helix joint is in the form of at least two intertwining helixes that extend along a length direction of each temple; wherein all of the front portion, the two temples and the helix joints of the spectacle frame are one 3D-printed monolithic piece.

15. The spectacle frame of claim 14, wherein the spectacle frame has a symmetry axis, and the helix joint comprises an inner side closing to the symmetry axis and an outer side away from the symmetry axis; a first portion of the helixes at the inner side of the helix joint have a smaller sectional profile, and a second portion of the helixes at the outer side of the helix joint have a larger sectional profile.

16. The spectacle frame of claim 14, wherein the helix joint has a front end connecting with the front portion and a rear end facing the other extremity of the temple; a connection portion that is L-shaped is disposed between the ends of the front portion and the front end of the helix joint.

17. The spectacle frame of claim 14, wherein the front portion comprises an upper rim and a lower rim;
the nose pad portion comprises a lower bridge portion and a pair of bent portions, the bent portions are respectively disposed at two opposite ends of the lower bridge portion and are spaced apart from each other;
the first bridge portion abuts against the upper rim, and the pair of bent portions extends along a rearward direction to define two nose-engaging surfaces; wherein the bent portions surround the lenses incompletely and the access space is disposed on the bent portions.

18. The spectacle frame of claim 17, wherein the lower rim comprises a lower left portion cooperating with a lower edge of the left lens, and a first right portion cooperating with a lower edge of the right lens; the nose pad portion is disposed between the first left portion and the first right portion;
the upper rim comprises a second left portion cooperating with an upper edge of the left lens, a second right portion cooperating with an upper edge of the right lens, and a second bridge portion intermediated between the second left portion and the second right portion;

the first bridge portion abuts against the second bridge portion, and the pair of bent portions extend between the two opposite ends of the first bridge portion and two inners ends of the first left portion and the first right portion.

19. A spectacle comprising a spectacle frame of claim 14, and two lenses held by the spectacle frame.

\* \* \* \* \*